United States Patent

Schwartz

[15] 3,685,909
[45] Aug. 22, 1972

[54] CLUBHEAD VELOCITY METER

[72] Inventor: Larry L. Schwartz, S-67 W-12685 Larkspur Road, Hales Corners, Wis. 53130

[22] Filed: Dec. 10, 1969

[21] Appl. No.: 883,977

[52] U.S. Cl. .....................356/28, 324/175, 324/178
[51] Int. Cl. ..............................................G01p 3/36
[58] Field of Search ......356/28; 324/178, 175; 343/8

[56] References Cited

UNITED STATES PATENTS 3,254,300  5/1966  Prell ..........................324/178

Primary Examiner—Benjamin A. Borchelt
Assistant Examiner—S. C. Buczinski
Attorney—Alter, Weiss and Whitesel

[57] ABSTRACT

Velocity meter electronically reads out the velocity of a golf club at the point in the swing of its juncture with the golf ball by measuring the voltage build up occurring responsive to the interference of the club with a pair of light beams impinging on a pair of photosensitive detectors.

9 Claims, 6 Drawing Figures

INVENTOR
LARRY L. SCHWARTZ

BY Alter and Weiss
ATTORNEYS

CLUBHEAD VELOCITY METER

My invention relates to a clubhead velocity meter, and more particularly to a device to record the speed of the swing of the golf club.

The prime object of my invention is to measure the effectiveness of the swing gauged by the velocity of the clubhead during the swinging action.

Still another object of the invention is to provide light sources spaced apart from one another so that the time interval required to travel between the light sources from one to the other is inversely proportional to the velocity of the head of the golf club.

A further object of my invention is to provide volt meter means that may be calibrated to show the velocity as measured by using the time interval required in traveling between the light sources.

The device is simple in construction and may be energized by line current or batteries.

Other and further objects of my invention will become more apparent as the description proceeds when taken in conjunction with the drawings, in which.

Figure 5:
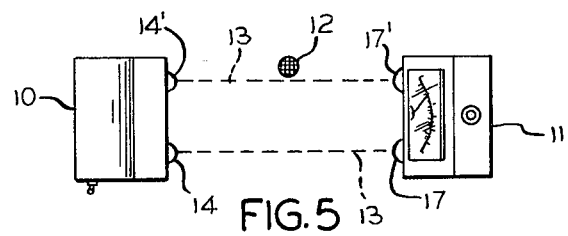
FIG. 5 is a top or plan view of the light emitter and light sensor placed in alignment with one another, with and in, their relation to the golf ball placed into position for contact with the golf club head.
Figure 4:
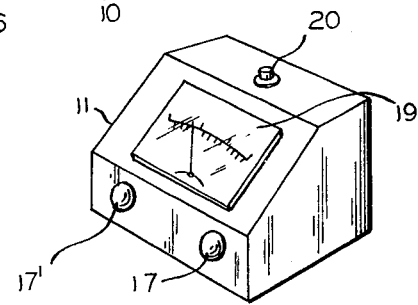
FIG. 4 is a perspective view of the light sensor, in which the lamp lenses, velocity meter, reset switch, and the various units constituting the circuit are disposed.

Similar parts and features shown in the various views are indicated as follows. The character 10 shows a light emitter, and the light sensor is shown as 11 with the golf ball 12 placed in position as shown in FIG. 5 with the rays of the light 13 being transmitted from the emitter unit 10 to the sensor unit 11.

Figure 1:
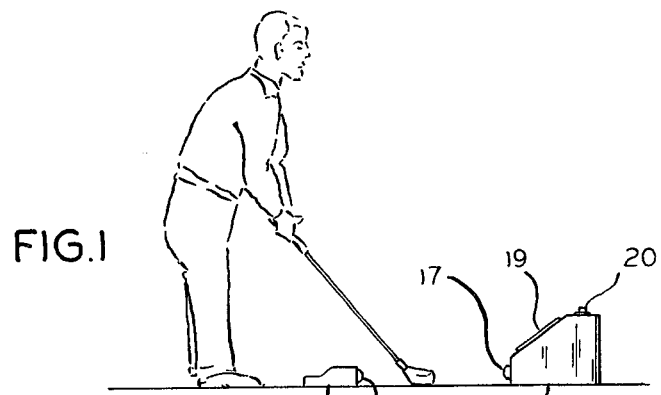
FIG. 1 is a general view of the device positioned for use by the operator.
Figures 2, 3:
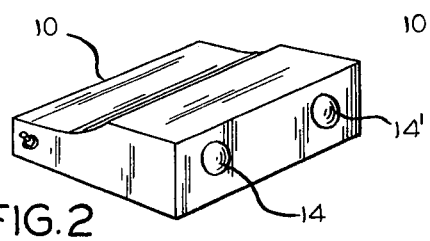
FIG. 2 is a perspective view of the light emitter.
FIG. 3 is a vertical cross-sectional view of the device shown in FIG. 2.

The light emitter 10 has lenses 14 and 14' spaced apart at any pre-determined distance, and a single lamp bulb 15 energized by a battery shown as 16 (see FIG. 3). Obviously, a plurality of lamp bulbs may be employed, and a source of light line current (not shown) may be used instead of the batteries.

The light sensor unit 11 is provided with a pair of lenses shown as 17 and 17', spaced apart to conform with the distance that the lenses 14 and 14' in the emitter 10 are spaced.

The light sensor 11 does not require a special lens at 17, 17' in as much as the light is focused and divided to lenses 17, 17' by lenses 14, 14' respectively. The volt meter 18 is of conventional design and is equipped with a scale shown as 19 which is calibrated to show the golf-head velocity, rather than the voltage. The circuit employed is designed (see FIG. 6) to retain the reading until the reset button 20 shown at the top of the sensor 11 is actuated to set the volt meter back to zero.

Obviously, a time delay relay circuit could be employed to automatically reset the meter with the time period adjusted by the user.

Both the light emitter 10 and the sensor 11 could be imbedded into the ground for a permanent installation at a driving range, or the like.

When the light emitter 10 and the sensor 11 are properly positioned, light from lenses 14, 14' are focused to impinge on lenses 17, 17' respectively. The golf club during the swing interfers first with the light beams extending between lenses 14, and 17, then and with the other light beam extending between lenses 14' and 17'. The time period between these interferences is measured to determine the velocity of the golf club.

Figure 6:
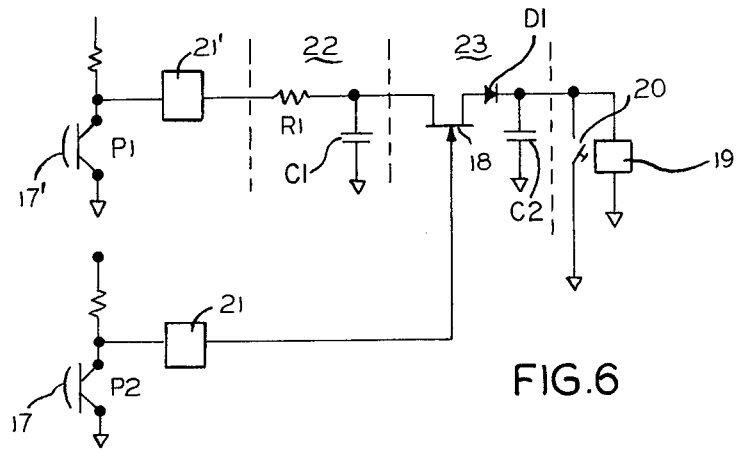
FIG. 6 is a schematic lay-out of a suggested electrical circuit.

In the electrical circuit embodiment shown in FIG. 6, the volt meter shown as 19 and the lenses 17 and 17' are part of the sensor 11. Also included in sensor 11 are means such as the monostable multivibrators 21 and 21' for providing signal pulses responsive to the golf clubs interference with the beams between lenses 14, 17 and 14', 17' respectively.

The multivibrators are actuated when the signals received from the photosensitive semiconductors P1, P2 are interrupted. The semiconductors P1, P2 provide signals as long as light impinges thereon. The signal is interrupted when the golf club breaks the light beams.

Means such as integrator 22 are provided for integrating the output of unit 21'. The integration of the output of course provides a voltage amplitude that is a function of the time interval of integration. The integration circuitry comprises series resistor R1 and capacitor C1. Thus, responsive to an output from multivibration 21' capacitor C1 charges at a rate determined by RC.

Means such as unijunction transistor 18 are provided for limiting the integrating interval to a function of the time interval of travel of the golf club between the light beams. More specifically the output of the monostable multivibrator 21 switches the unijunction device 18 to a non-conducting condition to enable circuit 22 to integrate the output of monostable multivibrator 21'.

Means such as capicator C2 are provided to store the voltage of the integrator 22 when the unijunction device 18 returns to its conducting condition. Switch 20 is provided to completely discharge capacitor D2 before a new reading is taken. Diode D1 may be provided to isolate capacitor C2 to keep it from discharging through the multivibrator circuit 21'.

In operation when the golf club interferes with the light beam impinging on photosensitive semiconductor P2 through lens 17, the change in the output of device P2 actuates the monostable multivibrator circuit 21 to provide its single timed pulse signal. The output pulse of multivibrator 21 operates the unijunction semiconductor 18 to its non-conductive condition.

Where the golf club next interferes with the light beam impinging on photosensitive semiconductor P1 through lens 17', the change in output of the device P1 actuates monostable multivibrator 21'. The output pulse of multivibrator 21' is integrated until the pulse from the monostable multivibrator 21 ceases, to cause unijunction transistor 18 to return to its conducting condition and thereby transfer the voltage from capacitor C1 to capacitor C2.

Since the amplitude of the integrated voltage is proportional to the time interval between the interferences of the two light beams, the volt meter can be calibrated directly in velocity units.

While I have shown a specific arrangement of the parts and features constituting my invention, I am fully cognizant of the fact that many changes may be made in the features and their arrangement, and I reserve the rights to make such changes as I may deem convenient or necessary without departing from the spirit of my invention or the scope of the claims.

Having thus described my invention, what I claim and desire to secure by letters patent in the United States is:

1. A velocity meter particularly useful for measuring the velocity of a golf club during the swing thereof,
    said velocity meter comprising: position sensing means for sensing when said golf club is in first and second positions during the swing,
    first pulse generating means for generating a first signal pulse responsive to said club being in said first position, second pulse generating means for generating a second signal pulse responsive to said club being in said second position,
    means responsive to said second pulse for generating a ramp signal,
    enabling means responsive to said first signal pulse for enabling the generation of said ramp signal for a fixed period of time determined by the length of said first signal pulse whereby the amplitude of said ramp signal is determined by the time duration between the initiation of said first pulse and said second pulse,
    and means for measuring the amplitude of said ramp signal to thereby obtain the velocity of the golf club.

2. The velocity meter of claim 1 wherein said position sensing means comprises a light source for generating a first and a second beam of light, and
    first and second photosensitive means in the path of said first and second beams respectively whereby the passage of said golf club through said beams causes a variation in the outputs of said photosensitive means.

3. The velocity meter of claim 2 wherein said first and second pulse generating means comprise first and second monostable multivibrators operated responsive to the change of output of said first and second photosensitive means respectively to provide box car output signals.

4. The velocity meter of claim 3 wherein said means for generating a ramp signal comprises integrator means coupled to the output of said second monostable multivibrator.

5. The velocity meter of claim 4 wherein storage means are provided for storing the signal amplitude of said integrator means at the end of said fixed period of time.

6. The velocity meter of claim 5 wherein said enabling means includes first switching means provided between said integrator and said storage means, and means for controlling said first switching means with the output of said first monostable multivibrator means.

7. The velocity meter of claim 6 wherein said first switching means comprises unijunction transistor means.

8. The velocity meter of claim 7 wherein said means for measuring the amplitude of said ramp signal comprises voltmeter means coupled across said storage means.

9. The velocity meter of claim 8 wherein said storage means comprises a capacitor, and shorting switch means for discharging said capacitors.

* * * * *